United States Patent [19] [11] 3,998,286
Ponikelsky et al. [45] Dec. 21, 1976

[54] MECHANICALLY, LATERALLY ADJUSTABLE TREADS FOR CRAWLER VEHICLES

[75] Inventors: Zdenek Ponikelsky, Plancenoit; Gerard M. G. J. Collignon, Fleurus, both of Belgium

[73] Assignee: Caterpillar Tractor Co., Peoria, Ill.

[22] Filed: Nov. 19, 1975

[21] Appl. No.: 633,351

[52] U.S. Cl. .............................. 180/9.48; 280/638
[51] Int. Cl.[2] .............................. B62D 55/00
[58] Field of Search ........... 180/9.48, 9.52, DIG. 2; 280/638, 656; 52/633

[56] References Cited

UNITED STATES PATENTS

| | | | |
|---|---|---|---|
| 2,763,330 | 9/1956 | Potter | 180/9.48 |
| 3,041,082 | 6/1962 | Burkdoll et al. | 280/656 |
| 3,193,060 | 7/1965 | Park | 52/633 X |
| 3,899,038 | 8/1975 | Griffith et al. | 180/9.48 |

*Primary Examiner*—Joseph F. Peters
*Assistant Examiner*—John A. Pekar
*Attorney, Agent, or Firm*—Frank L. Hart

[57] ABSTRACT

A crawler type vehicle has unique means for connecting roller frames with associated track to the car body for mechanical movement of the roller frames and associated track outwardly from the vehicle for selectively providing a wider work base for the vehicle. The connecting means of a construction sufficient for assuring desired connections of the roller frames to the car body at first and second positions of the roller frames and associated track.

6 Claims, 5 Drawing Figures

16 18 14 20 23 10 12 24 25

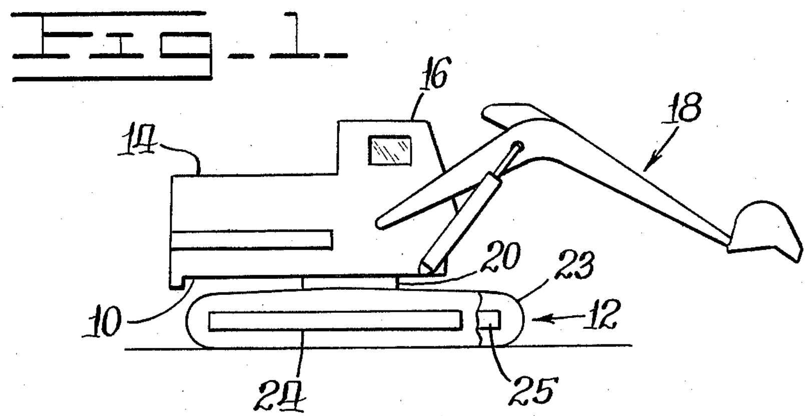
Fig-1-
16
18
14
20
23
10
12
24
25
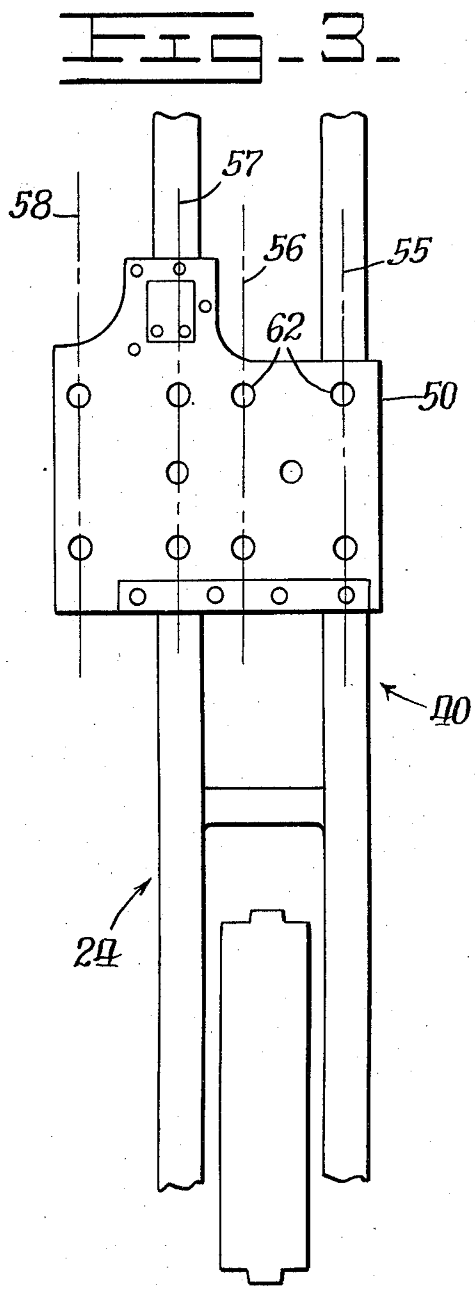
Fig-3-
57
58
56
55
62
50
40
24
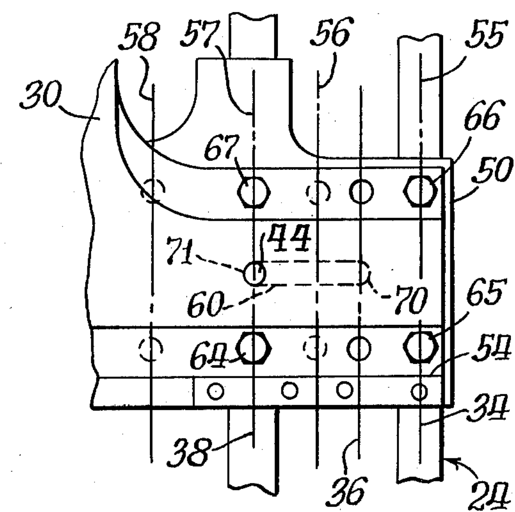
Fig-4-
58
57
56
55
30
66
67
50
71
44
60
70
65
64
54
34
38
36
24
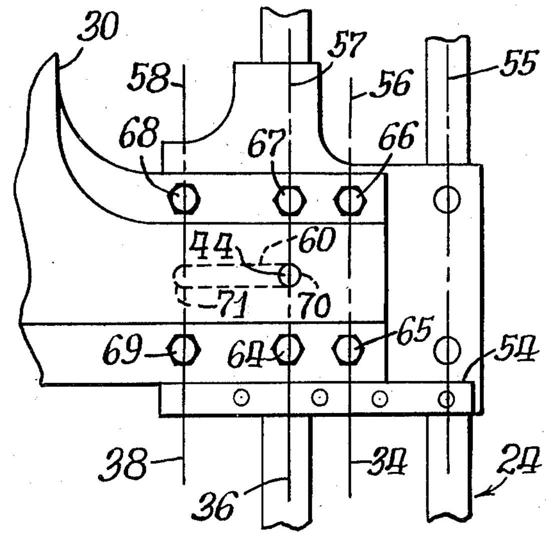
Fig-5-
30
57
58
56
55
68
67
66
44
60
71
70
69
64
65
54
38
34
36
24

26
50'
30
34
24
50
27
42
36
44
38
60
20
38'
36'
34'
28
46
32
29
48

MECHANICALLY, LATERALLY ADJUSTABLE TREADS FOR CRAWLER VEHICLES

BACKGROUND OF THE INVENTION

Crawler type work vehicles, such as excavators, are sometimes required to operate with the boom extending outwardly from a side of the vehicle. At this position, the moment arm of the boom functions to reduce the load that can be subjected on the boom owing to the width limits of the work base; i.e., the distance between the tracks.

U.S. Pat. No. 2,763,330 which issued Sept. 18, 1965 to K. F. Potter from an application filed Mar. 2, 1975 disclosed hydraulic means for connecting the track to the car body for hydraulic movement of the track outwardly from the car body and thereby providing a wider work base for the vehicle. Although this construction was of good design and functioned as desired, it was determined that if a mechanically operated system could be developed, the resultant system would be of more compact construction, would eliminate additional power equipment and requirements of the vehicle, and would be advantageous for use in remote areas where there is limited service available for repairing said vehicles. However, one serious problem to be overcome was to provide a mechanical system which would compensate for the additional strain that would be subjected onto extended tracks while reducing the possibility of the operator misaligning the track connecting system in the extended position and/or not fully connecting the roller frame to the car body.

This invention therefore resides in a connection system for mechanically, laterally adjusting tracks of a crawler vehicle.

BRIEF DESCRIPTION OF THE DRAWINGS

FIG. 1 is a diagrammatic side view of a crawler type vehicle upon which this invention can be utilized;

FIG. 3 is a diagrammatic plan view of a portion of the roller frame;

FIG. 4 is a diagrammatic plan view of a portion of the roller frame with said roller frame in the first or retracted position; and FIG. 5 is a diagrammatic plan view of a portion of the roller frame with said roller frame in the second or extended position.

DETAILED DESCRIPTION OF THE INVENTION

Figure 2:
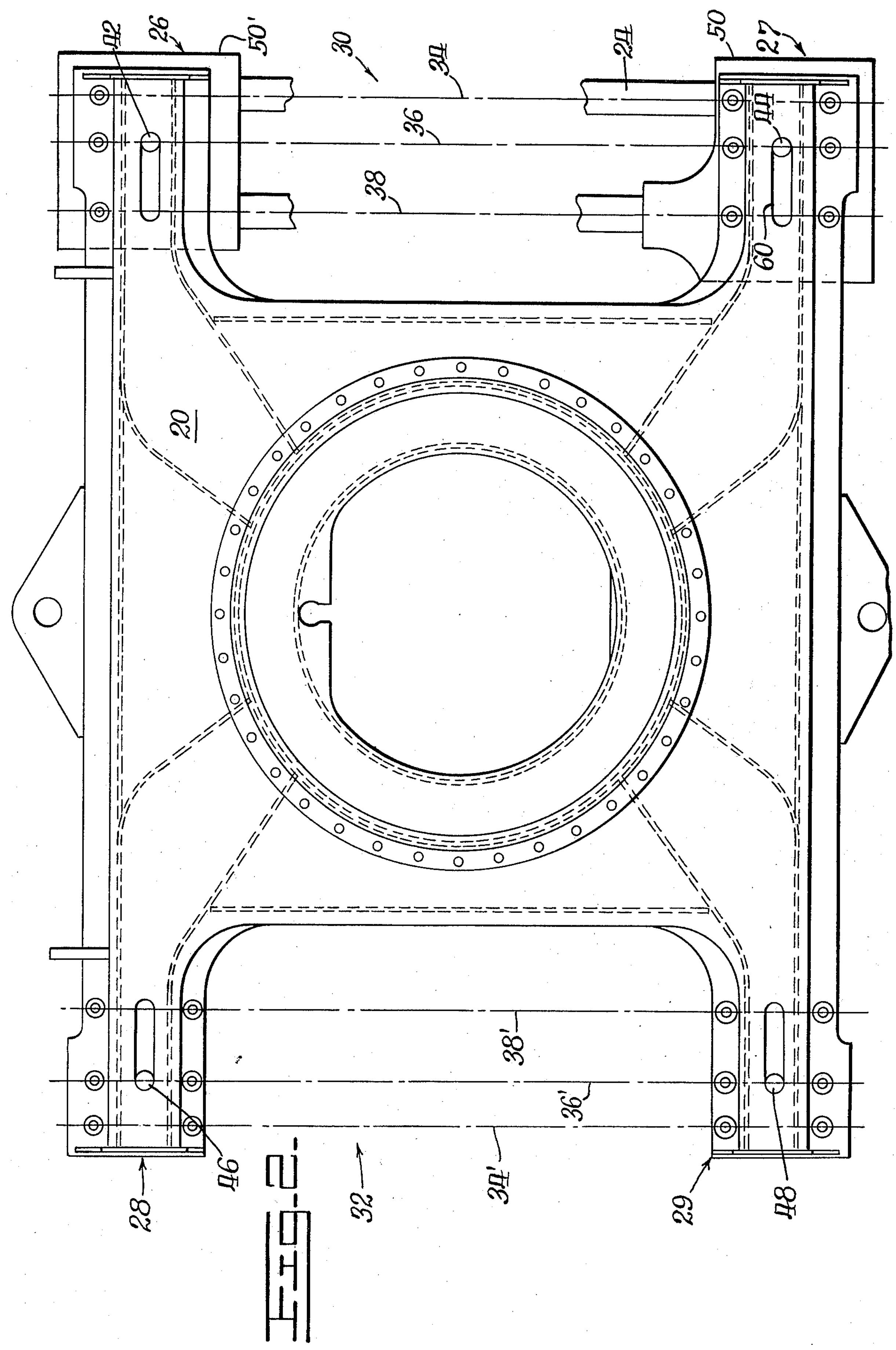
FIG. 2 is a diagrammatic plan view of the car body.

Referring to FIG. 1, a crawler type vehicle, such as an excavator as shown in the above-identified patent, a main frame 10 of the vehicle is rotatably connected to an undercarriage 12. The main frame 10 has a power unit 14, a cab 16, and a boom 18 connected thereto for rotation therewith. The undercarriage 12 has a car body 20 and first and second continuous tracks 22,23 connected by first and second roller frames 24,25 to and along opposed sides of the car body 20. These basic elements are known in the art and are more fully described in the above-identified patent.

Referring to FIG. 2, a set of spaced first and second flanges 26,27 and 28,29 extend outwardly from opposed sides 30, 32 of the car body 20.

Each set of flanges 26,27 and 28,29 have at least first, second and third systems 34,36,38 and 34',36',38' of bolt holes extending therethrough and positioned at preselected locations as hereafter more fully described.

In the preferred embodiment as shown in FIG. 2, the bolt hole systems 34,36,38 and 34',36',38' each lie in a plane that extends substantially parallel to a respective side 30 or 32 of the car body 20. It should be understood, however, that the bolt hole systems can be positioned at other limited locations without departing from this invention. For example, each bolt hole system can lie in a plane angularly oriented to the car body side or can be offset preselected distances from a preselected plane.

The first and second track roller frames 24,28, in the installed position, extend between respective first and second flanges 26,27 and 28,29. For simplicity, clarity, and brevity, the position of only one roller frame 24 is shown in FIG. 2.

Referring to FIG. 3, first and second connecting plates 50,50' are fixed, by welding for example, to each of the roller frames 24,25 at a location adjacent a respective car body flange at the connected position of the roller frames 24,25 to the car body. For simplicity, only one of the car body flanges 27 and associated connecting plate 50 will be described in detail. It should be understood however that, as set forth above, the other associations are similar.

The connecting plates 50,50' each have first, second, third, and fourth systems 55,56,57,58 of bolt holes that are each positioned along a preselected plane as described above with reference to the cooperating flanges 26,27. Each connecting plate or flange has a slot 60 with a pin 42,44,46,48 of the other of said respective plate or flange positioned in the slot in the installed position of the flanges over the respective plates. Here, the pin extends from the plate and the slot is found on the flange.

FIGS. 3 and 4 show the positions of the flanges over the associated plates and the relationship of the systems of the bolt holes and the pins and slots of these cooperating elements. Again, only the relationship of flange 27, connecting plate 50, pin 44, and slot 60 will be described for purposes of brevity.

As is known in the art, the pliable track 22,23 (FIG. 1) of the vehicle is carried by and extends along the respective elongated roller frames 24,26 and along the opposed sides 30,32 of the car body 20.

In this invention, the bolt holes of different bolt hole systems of the connecting plates and associated car body flanges are substantially coaxially aligned at different positions of the roller frame relatively to the car body 20. FIG. 4 shows the roller frame 24 positioned at a first or retracted position at which the roller frame 24 and associated track (not shown) are maintained a first distance from a respective side 30 of the car body 20. FIG. 5 shows the roller frame 24 positioned at a second or extended position at which the roller frame 24 and associated track are maintained a second greater distance from the respective side of the car body 20.

Referring to FIG. 4, in the retracted position of the elements, the bolt holes of the first and third bolt hole systems 55,57 of the connecting plate 50 are substantially coaxially aligned with the bolt holes of the first and third bolt hole systems 34,38 of the flange 27. At this position, bolts 64,65,66,67 are positioned therethrough for fixing elements 27,50 together and maintaining roller frame 24 and associated track 22 at the retracted position.

Referring to FIG. 5, in the extended position of the elements, the bolt holes of the second, third, and fourth bolt hole systems 56,57,58 of the connecting plate 50 are substantially coaxially aligned with the bolt holes of the first, second, and third bolt hole systems 34,36,38 of the flange 27. At this position, bolts 64,65,66,67,68,69 are positioned therethrough for fixing elements 27,50 together and maintaining the right roller frame 24 and associated track 22 at the extended position.

The slot 60 and pin 44 of elements 27,50, and corresponding like elements of the connecting system, are each positioned at relative locations sufficient for positioning the pin abutting a first end 70 of the slot 60 at the first position (FIG. 4) of the roller frame 24 and at the second end 71 of the slot 60 at the second position (FIG. 5) of the roller frame 24. By so positioning the slots and the pins, the associated roller frame 24 is provided with a stop means at each first and second position and a guide means during movement of the roller frame from one position toward the other.

In order to further assure that the operator correctly positions the connecting plates relative to the cooperating flanges at both the first and second positions, the bolt holes of the second and fourth bolt hole systems 56,58 of the connecting plate 50 are spaced from bolt holes of the respective flanges at the first position of the elements. Therefore, during movement of the elements between the first and the second positions, the only bolt hole arrangement for connecting the elements together would be where the bolt holes of the second systems 36,56 are aligned. It would therefore be obvious that the elements were misaligned for connection since only two bolts would pass through both elements 27,50 at this position.

This feature therefore protects the system from damage resulting from lifting a load when the track extension system is improperly connected together. This placement of bolt holes also aids the operator in remembering to utilize additional bolts in the extended position and saves time of connection in the retracted position where there is less stress involved and additional connections are not needed.

It will be noticed in the preferred embodiment shown that each bolt hole system composes at least two bolt holes on each plate and at least two bolt holes on each flange. Therefore, at least four bolts pass through each connecting plate and associated car body flange at the first position of the respective roller frame and at least six bolts pass through said elements at the extended position.

In order to maintain movement of the plates of a roller frame to linear movement between the first and second positions, guide rails 54 extend outwardly from each of the connecting plates and along a side of the respective flange in the installed position. These guide rails cooperate with the associated pins and slots to maintain substantially linear movement and prevent canting of the roller frame relative to the car body.

In extending the track on, for example, the right side, all of the bolts 64,65,66,67 (and corresponding bolts not shown) are removed from each of the first and second flanges 26,27 and associated first and second connecting plates 50,50'. The boom or boom associated work element is thereafter retracted in contact with the ground on the opposed side of the vehicle for sliding the connecting plate along the respective flanges 26,27 to the second position. Bolts 64-69 (and associated bolts) are thereafter inserted through the flanges 26,27 and the respective associated elements. The apparatus can be returned to the first position by reversing the procedure.

It should also be understood that the roller frame and associated track can also be moved between the first and second positions by other means such as a hand operated steel bar.

Other aspects, objects and advantages will become apparent from a study of the drawings, the disclosure, and the appended claims.

What is claimed is:

1. In a crawler type vehicle having a main frame rotatably connected to an undercarriage, said main frame having a power unit, a cab, and a boom connected thereto and said undercarriage having a car body, first and second roller frames connected on opposed sides of the car body, and first and second continuous tracks each connected to a respective roller frame and to the power unit, the improvement comprising:

means for connecting each of the roller frames to the car body for independent movement between a first position at which a roller frame and associated track are maintained a first distance from a respective side of the car body and a second position at which the roller frame and associated track are maintained a second greater distance from a respective side of said car body, said means comprising a set of first and second spaced car body flanges extending outwardly from opposed sides of the car body, each set of first and second flanges having at least first, second, and third systems of bolt holes positioned at preselected locations;

first and second connecting plates fixed to each of the roller frames adjacent a respective car body flange, each first and second connecting plate having at least first, second, third, and fourth systems of bolt holes positioned at preselected locations, said bolt holes of the first and third systems through the associated plates and car body flanges being substantially coaxial at the first position of the respective roller frame and associated track, said bolt holes of the second, third, and fourth systems of bolt holes through the plates being substantially coaxial with the bolt holes of respective first, second, and third systems of bolt holes through the flanges at the second position of the respective roller frame and associated track, and said second and fourth systems of plate bolt holes being spaced from bolt holes of the respective flanges and being covered by said flanges at the first position of the roller frame for assuring desired connections of the roller frames to the car body at the first and second positions of the roller frames.

2. Apparatus, as set forth in claim 1, including a guiding rail extending outwardly from each of the plates and along a side of a respective flange at a location sufficient for maintaining movement of the plates to linear movement.

3. Apparatus, as set forth in claim 1, including a pin extending outwardly from one of each flange or plate and into a slot extending along each of said other flange or plate, said slots and pins being positioned at locations sufficient for having the pins abutting a first end of the slots at the first position of the roller frame and at the second end of the slots at the second position of the roller frame.

4. Apparatus, as set forth in claim 1, wherein each bolt hole system comprises at least two bolt holes on each plate and at least two bolt holes on each flange.

5. Apparatus, as set forth in claim 1, including at least four bolts passing through each connecting plate and associated car body flange at the first position of the respective roller frame and at least six bolts passing through each connecting plate and associated car body flange at the second position of the respective roller frame.

6. Apparatus, as set forth in claim 1, wherein the planes of the bolt hole systems extend substantially parallel relative to one another.

* * * * *